E. M. DEEMS.
BONDING PIN.
APPLICATION FILED FEB. 25, 1915.
1,181,577.
Patented May 2, 1916.
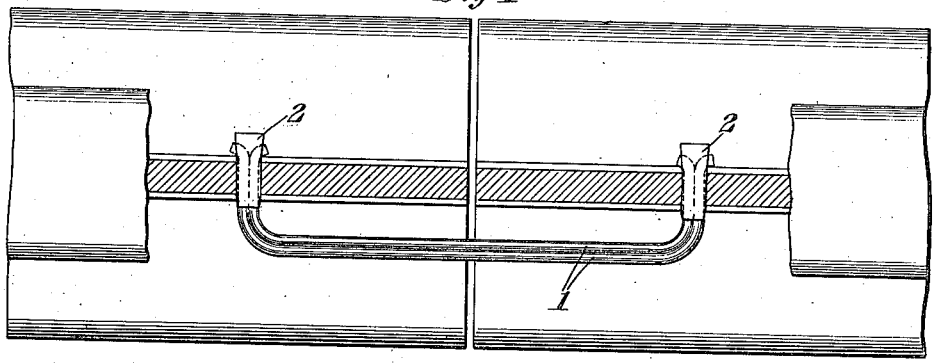
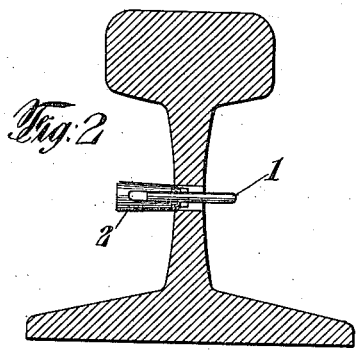
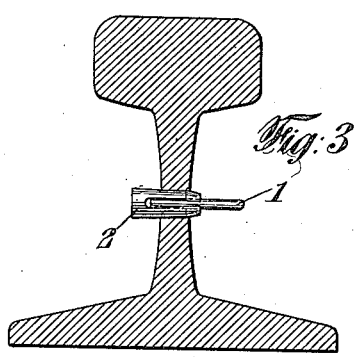
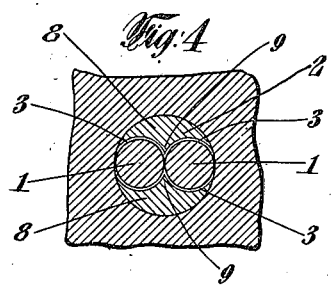
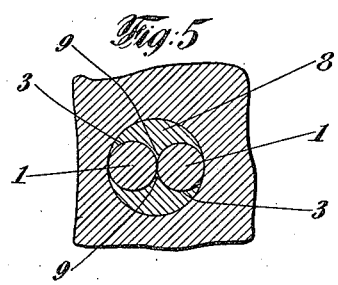
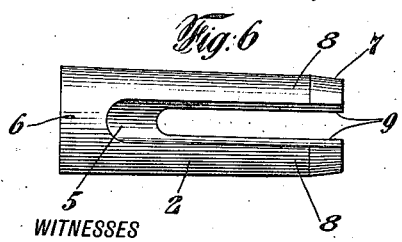
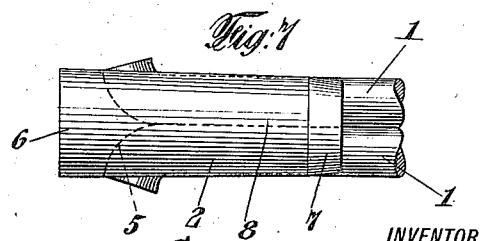
WITNESSES
John E. Prager
F. P. Miller
INVENTOR
Edward M. Deems
BY
Davis Davis
his ATTORNEYS.

UNITED STATES PATENT OFFICE.

EDWARD M. DEEMS, OF EAST ORANGE, NEW JERSEY.

BONDING-PIN.

1,181,577. Specification of Letters Patent. Patented May 2, 1916.

Application filed February 25, 1915. Serial No. 10,407.

*To all whom it may concern:*

Be it known that I, EDWARD M. DEEMS, a citizen of the United States, and resident of the city of East Orange, county of Essex, State of New Jersey, have invented certain new and useful Improvements in Bonding-Pins, of which the following is a specification.

This invention relates to bonding pins for the attaching of bonding wires to railroad rails, and relates particularly to a bonding pin adapted for attaching the ends of two bonding wires to a rail in one operation thereby avoiding the expense of individually securing the two bonding wires.

The main object of the invention is to provide a double bonding pin having two longitudinally extending grooves on its opposite sides to receive the ends of the bonding wires, the wire-embracing portions of the pin being in the form of gripping fingers adapted to be caused to grip and clamp the wires when the pin is driven into the aperture in the rail web. These fingers are separated from each other throughout their length so that the two bonding wires contact with each other throughout a substantial portion of the length engaged with the pin.

Another object of the invention is to so construct the pin that it may be inserted in a comparatively small aperture in the rail web. Said aperture need be only of sufficient diameter to receive the two wires arranged close together and in contact with each other so that the wires will be in close engagement with each other and with the wall of the aperture.

There are other objects and advantages of the invention which will appear hereinafter.

In the drawing, Figure 1 is a longitudinal horizontal sectional view through the end portions of two rails showing the invention applied thereto; Fig. 2 a transverse vertical sectional view of one rail showing the bonding wires and the bonding pin in position, and before the pin is driven into the rail aperture; Fig. 3 a similar view to Fig. 2 showing the bonding pin driven into the rail aperture; Fig. 4 a vertical section showing the pin and the bonding wires assembled in the rail web and before the pin is driven into the aperture; Fig. 5 a similar view to Fig. 4 showing the pin driven into the aperture; Fig. 6 a side elevation of the bonding pin; and Fig. 7 a plan view thereof showing the ends of the wires in the grooves.

Referring to the various parts by numerals, 1 designates the bonding wires and 2 the bonding pin. The pin is formed with two longitudinally extending wire-receiving grooves 3 arranged on opposite sides thereof. These grooves, for the greater portion of the length of the pin, extend entirely through the pin, as shown clearly in Figs. 4 and 6, so that there is no wall between them. The inner ends 4 of the grooves are gradually reduced in depth so that they end at a point 5 within the length of the pin, leaving a solid driving head 6. The pin is tapered from the larger driving head end thereof to the smaller entering end 7. This taper, however, is slight, but is sufficient to secure a considerable contraction or compression of the pin when it is driven into the aperture in the web of the rail. By extending the wire receiving grooves 3 transversely through the bonding pin 2 separate and independent wire gripping fingers 8 are formed, said fingers extending throughout a substantial portion of the length of the pin. Each gripping finger on its inner face is curved and forms portions of each of the wire receiving grooves 3; and these curved portions terminate at their inner ends in longitudinally extending ridges 9 which fit between the wires when the said wires are placed in the grooves. There is considerable space, however, between the ridge 9 of one finger and the corresponding ridge of the other finger so that the wires when arranged in the pin contact with each other along the longitudinal center line of the pin. The aperture in the rail web should be just twice the diameter of the bonding wire so that the two wires will contact with the wall of said aperture and will also contact with each other. By this means the aperture in the rail web is reduced to its smallest possible dimensions and consequently the expense and labor of drilling said aperture is reduced to the minimum.

In operation the bonding wires are passed through the apertures in the rails and arranged in the bonding pins as illustrated in Fig. 2. The pins are then driven into the said apertures, the gripping fingers 8 being forced into intimate contact with the bonding wires by reason of the taper of the pin.

From the foregoing it is manifest that the important feature of this invention is to provide a double bonding pin having two wire engaging parts, each of which is adapted to engage a substantial portion of two wires, said two parts being adapted to be driven in the aperture in the rail web and to grip or clamp the two wires in one aperture. The form shown in the drawings and described herein is a convenient and satisfactory method of constructing a pin of this character, but it will, of course, be understood that the two-part pin may be in other forms and I desire it understood that I am to be limited only to forms within the scope of the claims.

What I claim is:

1. A bonding pin consisting of a longitudinally tapered body portion having two wire-receiving grooves formed in its opposite sides throughout a substantial portion of its length, said grooves extending transversely through the pin to form two oppositely disposed longitudinally extending wire gripping fingers, the free ends of said fingers being at the smaller end of the pin.

2. A bonding pin consisting of a tapered body portion having two wire receiving grooves formed in its opposite sides throughout a substantial portion of its length, said grooves extending transversely through the pin to form two oppositely disposed longitudinally extending wire gripping fingers, the free ends of said fingers being at the smaller end of the pin and said grooves terminating short of the larger end of the pin to form a solid driving head, the walls of the said grooves forming two curved surfaces on the inner side of each gripping finger adapted to contact with the wires.

3. A bonding pin consisting of a longitudinally tapered body portion having two wire-receiving grooves formed in its opposite sides throughout a substantial portion of its length, said grooves extending transversely through the pin to form two oppositely disposed longitudinally extending wire gripping fingers, the free ends of said fingers being at the smaller end of the pin, said grooves terminating short of the larger end of the pin to form a solid driving head.

4. A bonding pin consisting of a longitudinally tapered body portion having two wire receiving grooves formed in its opposite sides, said grooves extending transversely through the pin to form two oppositely disposed longitudinally extending wire gripping fingers, each finger having a concaved portion which forms a part of the wall of the wire receiving grooves.

5. A bonding pin consisting of a tapered body portion having two wire receiving grooves formed in its opposite sides, said grooves extending transversely through the pin to form two oppositely disposed longitudinal extending wire gripping parts, the walls of the said grooves forming two concave surfaces on the inner side of each gripping part, said concaved surfaces being adapted to contact with the wires.

6. A double bonding pin comprising a longitudinally tapered body part formed of two wire gripping parts having a free space between them, each of said parts being adapted to receive and engage a substantial portion of the exterior surface of two wires.

7. A bonding pin consisting of a longitudinally tapered body portion having wire-receiving grooves extending longitudinally thereof, said grooves extending transversely through the pin to form oppositely disposed longitudinally extending wire-gripping fingers, each finger having a concave portion which forms a part of the wall of the wire-receiving grooves.

8. A bonding pin adapted to grip a plurality of bonding wires and comprising a longitudinally tapered body part formed of wire-gripping parts having a free space between them, each of said parts being adapted to receive and engage a substantial portion of the exterior surface of two wires.

In testimony whereof I hereunto affix my signature in the presence of two witnesses.

EDWARD M. DEEMS.

Witnesses:
F. R. MILLER,
MINERVA VAN ALEN.